US007870481B1

(12) United States Patent
Zaud et al.

(10) Patent No.: US 7,870,481 B1
(45) Date of Patent: Jan. 11, 2011

(54) METHOD AND SYSTEM FOR PRESENTING AUTOMATICALLY SUMMARIZED INFORMATION

(75) Inventors: Victor Zaud, 720 York St., Ste 116, San Francisco, CA (US) 94110-2154; Hans Larsen, San Francisco, CA (US)

(73) Assignee: Victor Zaud, San Francisco, CA (US)

( * ) Notice: Subject to any disclaimer, the term of this patent is extended or adjusted under 35 U.S.C. 154(b) by 910 days.

(21) Appl. No.: 11/716,386

(22) Filed: Mar. 8, 2007

Related U.S. Application Data

(60) Provisional application No. 60/780,661, filed on Mar. 8, 2006.

(51) Int. Cl.
G06F 15/00 (2006.01)
G06F 17/30 (2006.01)

(52) U.S. Cl. ............... 715/234; 715/205; 715/254; 715/255; 715/273; 707/804; 707/805; 707/E17.065; 707/E17.094

(58) Field of Classification Search ......... 715/200–205, 715/207, 209, 226, 231, 234, 254, 255, 256, 715/273, 274, 760; 707/1–3, 100, 102, 104.1, 707/200, 705, 708, 804, 805, 913, 914, 915, 707/916, 917, 918, E17.004, E17.005, E17.065, 707/E17.067, E17.084, E17.094, E17.107, 707/E17.116, E17.117, E17.138
See application file for complete search history.

(56) References Cited

U.S. PATENT DOCUMENTS

| 6,035,323 | A  | * | 3/2000  | Narayen et al. ......... 709/201 |
| 6,199,082 | B1 | * | 3/2001  | Ferrel et al. ........... 715/205 |
| 6,301,586 | B1 | * | 10/2001 | Yang et al. ........... 707/104.1 |
| 7,171,629 | B2 | * | 1/2007  | Quimby .............. 715/854 |
| 7,346,668 | B2 | * | 3/2008  | Willis ............... 709/219 |
| 2002/0049783 | A1 | * | 4/2002  | Berk et al. ........ 707/500.1 |
| 2003/0097410 | A1 | * | 5/2003  | Atkins et al. ......... 709/206 |
| 2004/0145603 | A1 | * | 7/2004  | Soares ............... 345/730 |
| 2004/0250205 | A1 | * | 12/2004 | Conning ............. 715/517 |
| 2007/0088678 | A1 | * | 4/2007  | Farago et al. .......... 707/3 |
| 2007/0143683 | A1 | * | 6/2007  | Quimby .............. 715/730 |
| 2007/0245379 | A1 | * | 10/2007 | Agnihortri ............ 725/46 |
| 2007/0250479 | A1 | * | 10/2007 | Lunt et al. ............ 707/3 |

FOREIGN PATENT DOCUMENTS

WO   WO 98/47083   * 10/1998

OTHER PUBLICATIONS

Liu et al., "Personalized Web Views for Multilingual Web Sources", Nanyang Technological University, IEEE, July-August, pp. 16-22.*
Y. Quintana et al., "Design of an Object-Oriented Multimedia Database for Personalized Multimedia Views", IEEE, May 1996, pp. 282-285.*
Agnihotri et al., "Framework for Personalized Multimedia Summarization", ACM, 2005, pp. 81-88.*
Lee et al, "User Evaluation of Fi'schla'r-News: An Automatic Broadcast News Delivery System", ACM, Apr. 2006, pp. 145-189.*
Coppermine Photo Gallery v1.3.3: Documentation and Manual; About Coppermine, Oct. 2005, 48 pages.*

* cited by examiner

*Primary Examiner*—Laurie Ries
*Assistant Examiner*—Maikhanh Nguyen
(74) *Attorney, Agent, or Firm*—Quine Intellectual Property Law Group; Stephen J. LeBlanc

(57) ABSTRACT

Methods and systems for providing display of information over a network or communications medium or at a kiosk or other display site by accessing an original presentation comprising two or more items and using an automatic summary module to automatically create a layout and a view comprising an arrangement items by analyzing a total number and relative number of each type or amount of media items.

10 Claims, 9 Drawing Sheets

METHOD AND SYSTEM FOR PRESENTING AUTOMATICALLY SUMMARIZED INFORMATION

CROSS REFERENCE TO RELATED APPLICATIONS

This application claims priority from U.S. Patent Provisional Application No. 60/780,661 filed 8 Mar. 2006 and incorporated herein by reference, the Provisional Application entitled METHOD AND SYSTEM FOR PRESENTING AUTOMATICALLY SUMMARIZED INFORMATION, and listing inventor Victor Zaud.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to information systems and methods and, more particularly, to computer systems, methods, and applications that allow for flexible presentation of information.

that is automatically derived from underlying more extensive information. In further embodiments, the invention involves one or methods that may be implemented on a data handling device or system, such as a computer or other information enabled device. In further embodiments, the invention involves methods and/or systems for delivering summarized information over a communication network. In further embodiments, the invention involves methods and/or systems for providing associated services.

TECHNICAL FIELD

The present invention relates to a computer method and system for placing an order and, more particularly, to a method and system for ordering items over the Internet.

BACKGROUND OF THE INVENTION

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

Computers and computer networks have in the past decade become important platforms for communication and information presentation. The Internet, using various protocols, allows one computer system (normally referred to as a server) to send text, video, audio and graphical to another computer system (normally referred to as a client). The various protocols that are utilized on the Internet (or World Wide Web) for presentation of information using a "web browser" are very well known in the art and will not be described in detail here.

The Internet has increasingly been used as a platform for millions of individuals to make content available to millions of users. Some typical methods and systems for doing this include primarily text-based "diary" hosting services (such as "blogs"), primarily video based video sharing services (such as YouTube), primarily photo based services (such as flickr) and services for connecting to personal profiles of individuals, such as MySpace.

An issue that arises in many of these services is how ordinary users will input or upload text or other information to a web server in a way that allows the web server to effectively and attractively present that information to other users. Services such as Flickr and YouTube generally provide a very standardized format for both uploading content and for presenting that content to other users. Other services, such as Blogspot, provide a more sophisticated and variable set of templates and commands that allow a creator a substantial amount of freedom in designing a web presentation, but generally restricted in some ways to an overall standard format.

APPENDIX

This application incorporates by reference herein in its entirety any file submitted on duplicate compact disks OR alternatively submitted electronically with this submission via EFS. This submission, if present, provides an example computer program listing implementing aspects of the present invention according to specific embodiments.

A number of various strategies have been proposed for providing varying display of parts of underlying information, particularly information summarized from HTML text. However, with the growth of new forms of presentation, either at a location such as a museum or via an online museum, there remains a need for improved ways for displaying such information.

SUMMARY

According to specific embodiments, the present invention is involved with methods and/or systems and/or devices that can be used together or independently to allow a user to upload text, graphics, photos, video, audio to a web server, and for that web-server to then provide at least two different automatically generated views of that information. According to the invention, a computer executed logic process determines a gallery view from the uploaded information. The gallery view includes one or more of computer-selected and arranged portions of text, computer selected and arranged graphics or photographs, computer selected and arranged video, and computer selected and arranged audio.

includes which is automatically generated from a story that can include one or more of text, headings, photos, videos, etc.

In specific embodiments, the invention involves a platform for an online virtual museum exhibit with an automatically generated format. In specific embodiments, an exhibit platform according to the invention provides a graphical interface that allows viewers to view a story in either an automatically selected and formatted gallery view or in a detail view or story view, which provides access to the full content of the story. In further embodiments, one or more views allows a viewer to contribute their own personal anecdotes, photos, and comments.

In further embodiments, the invention can be understood as translating various characteristics of a museum visit experience to an online format. In a physical museum, a typical visitor experiences exhibits in two different ways. First, the visitor 'browses' exhibits as he walks from point to point, gazing at different items in the museum space. When the visitor notices something that catches the eye, the visitor 'engages' with the exhibit, noting the detail and contemplating the larger significance of the work. The present invention, in specific embodiments, mimics this duality by creating both a gallery view of a story—showcasing the high level summary of a story, as if from 'afar'—and a detail view—where a visitor can delve deeper into a story and optionally participate in a discussion about the story. Thus the invention in specific embodiments allows for different vantage points and levels of engagement. In further embodiments, the ability to add story or comment allows a visitor to be a part of a changing exhibit.

In specific embodiments, the invention can use open source technologies or Linux or platforms such as Microsoft's .NET framework.

The 'gallery' view (patent pending) is a unique dynamic aspect of the system. Stories are managed through the system's content management system. The gallery view is coded to 'smartly' determine the most relevant information to show visitors based on a multitude of algorithms and programming. Thus, the gallery view module provides a dynamic representation of a story and eliminates the need for editors to hand-create each gallery view.

Various embodiments of the present invention provide methods and/or systems for presenting information over a communications network. According to specific embodiments of the invention, a client system is provided with a set of interfaces that allow a user to view and/or interact with and/or upload information. The client system displays information and/or interfaces supplied by a server system. In one aspect, in response to a user input, a client system sends to a server system an indication of whether a user wishes to view information in a story or detail view or in a gallery view. In further embodiments, the client system allows the user to, via forms or similar mechanisms, post information into an exhibit.

Thus, in further embodiments, the present invention may be understood in the context of providing information, such as a virtual interactive museum exhibit, over a communication media. An important application for the present invention, and an independent embodiment, is in the field of providing education or museum information over the Internet, optionally using Internet media protocols and formats, such as HTTP, RTTP, XML, HTML, dHTML, VRML, Flash, css, as well as image, audio, or video formats etc. However, using the teachings provided herein, it will be understood by those of skill in the art that the methods and apparatus of the present invention could be advantageously used in other related situations where users access content over a communication channel, such as modem access systems, institution network systems, kiosks, wireless systems, etc.

Software Implementations

Various embodiments of the present invention provide methods and/or systems for information summarizing and/or presentation that can be implemented on a general purpose or special purpose information handling appliance using a suitable programming language such as Perl, Java, C++, Cobol, C, Pascal, Fortran., PL1, LISP, assembly, etc., and any suitable data or formatting or media specifications, such as those know in the art and/or referenced herein. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

BRIEF DESCRIPTION OF THE DRAWINGS

FIG. 2A illustrates a graphical user interface of information displayed using an automatically generated gallery view optionally in one screen according to specific embodiments of the invention.

FIG. 5 illustrates an example administrative graphical user interface for inputting portions of content (such as, a story) to be selectively displayed as a story view or gallery view according to specific embodiments of the invention.

FIG. 6 illustrates an example administrative graphical user interface for indicating files to be included as portions of content (such as, a story) to be selectively displayed as a story view or gallery view according to specific embodiments of the invention.

DESCRIPTION OF SPECIFIC EMBODIMENTS

Before describing the present invention in detail, it is to be understood that this invention is not limited to particular compositions or systems, which can, of course, vary. It is also to be understood that the terminology used herein is for the purpose of describing particular embodiments only, and is not intended to be limiting. As used in this specification and the appended claims, the singular forms "a", "an" and the include plural referents unless the content and context clearly dictates otherwise. Thus, for example, reference to "a device" includes a combination of two or more such devices, and the like.

Unless defined otherwise, technical and scientific terms used herein have meanings as commonly understood by one of ordinary skill in the art to which the invention pertains. Although any methods and materials similar or equivalent to those described herein can be used in practice or for testing of the present invention, the preferred materials and methods are described herein.

DETAILED DESCRIPTION

Figure 1A:
FIGS. 1A and B illustrate two different portions of a graphical user interface or presentation display using a story view according to specific embodiments of the invention.
Figure 1B:
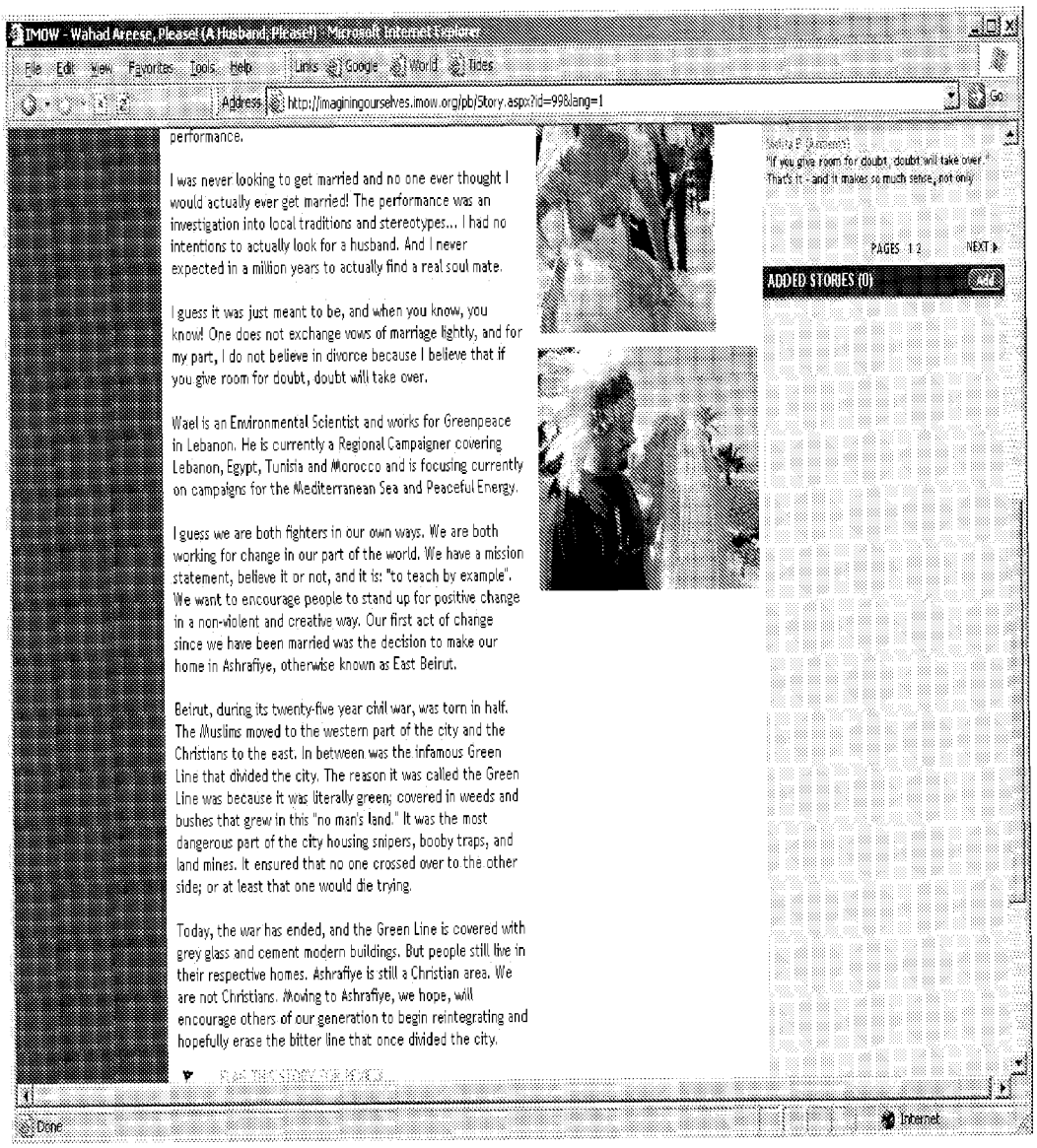
FIG. 1C illustrates one portion of a graphical user interface or presentation display using a story view according to specific embodiments of the invention and showing an alternative example story.
Figure 1C:

FIGS. 1A and B illustrate two different portions of a graphical user interface or presentation display using a story view according to specific embodiments of the invention. FIG. 1C illustrates one portion of a graphical user interface or presentation display using a story view according to specific embodiments of the invention and showing, an alternative example story. As shown in this figure, this example story consists of text on the left side of the screen and a set of photographs on the right side. This is one type of simple layout for text and graphics that may be familiar from various data sources on the world wide Internet. In this particular embodiment, the story is displayed along with an indication or button labeled "gallery" that allows a user to view this story in a automatically generated gallery view.

Figure 2B:
FIG. 2B shows a gallery view of an alternative example story according to specific embodiments of the invention.

FIG. 2A illustrates a graphical user interface of information displayed using an automatically generated gallery view optionally in one screen according to specific embodiments of the invention. FIG. 2B shows a gallery view of an alternative example story according to specific embodiments of the invention. In this example, representative portions of text and photos are arranged by an automatic summarizer module according to specific embodiments of the invention. As can be seen, the gallery view according to specific embodiments of the invention provides an arrangement of items summarized from the full text view and also provides links to related items at the bottom of the graphical display.

Figure 3:
FIG. 3 illustrates a graphical user interface or presentation displayed as a story view consisting primarily of photos according to specific embodiments of the invention.

FIG. 3 illustrates a graphical user interface or presentation displayed as a story view consisting primarily of photos according to specific embodiments of the invention.

Figure 4:
FIG. 4 illustrates a graphical user interface or presentation of a story consisting primarily of photos displayed as a gallery view according to specific embodiments of the invention.

FIG. 4 illustrates a graphical user interface or presentation of a story consisting primarily of photos displayed as a gallery view according to specific embodiments of the invention.

Examples of Inputting Content and Generating Views

From the examples of stories displayed in story view and gallery view above, it will be apparent to one of skill in the art that there are numerous different specific methods for inputting and managing content and numerous different rules sets, options, or other specific algorithmic approaches for implementing the invention. The following illustrations of administrative interfaces and descriptions of a specific logic approach for determining presentation formatting are provided for illustration purposes and to discuss specific aspects of specific implementations that may also be novel. These specific examples shall not be taken to limit the invention as taught above.

Figures 5, 6:
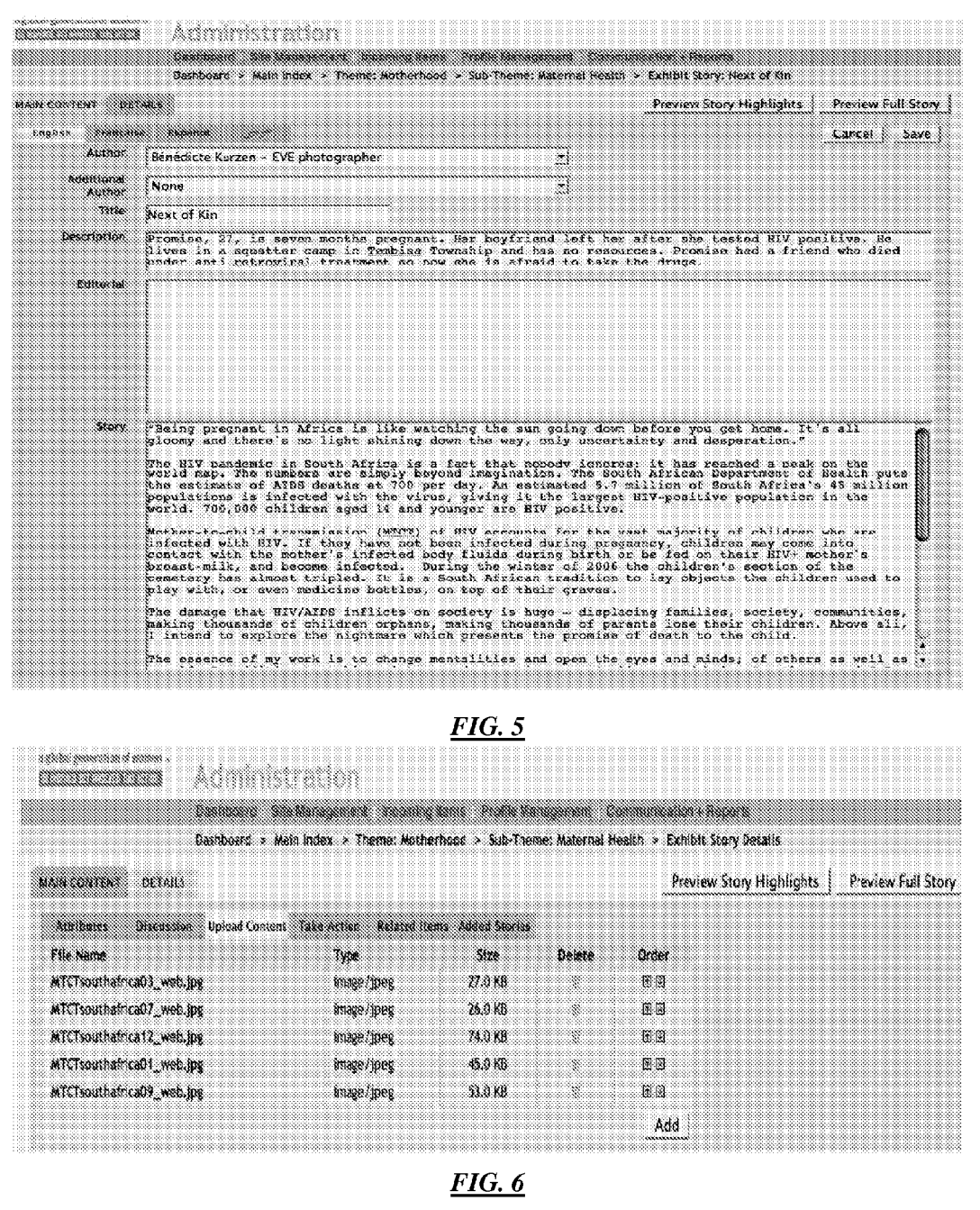

FIG. 5 illustrates an example administrative graphical user interface for inputting portions of content (such as, a story) to be selectively displayed as a story view or gallery view according to specific embodiments of the invention. The figure shows a number of input fields for inputting text relating to story content, author, etc. Various methods for inputting text into such an interface are well known in the art.

FIG. 6 illustrates an example administrative graphical user interface for indicating files to be included as portions of content (such as, a story) to be selectively displayed as a story view or gallery view according to specific embodiments of the invention. The figure shows a number of input indications for media and/or text files, and provides the example administrative control allow an author or editor to delete files, change the indicated order or importance of files, and see file information such as size. While jpeg photo files are shown in this example, video files, audio files, text files, multimedia files (such as HTML), and links (such as URLs) can similarly be added to a story in various embodiments. Various methods for selecting or indicating files into a user interface are well known in the art and any such method can be used according to specific embodiments of the invention.

Figure 7:
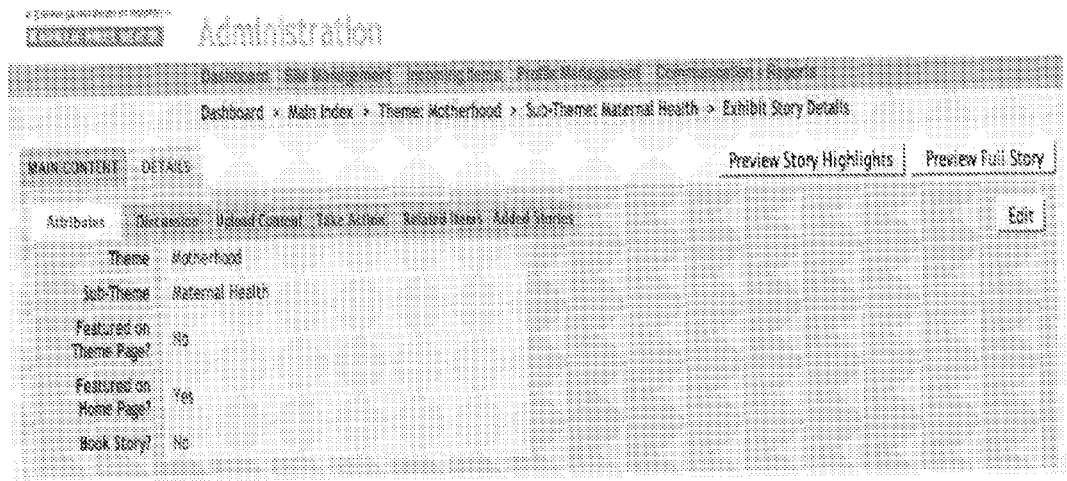
FIG. 7 illustrates an example administrative graphical user interface for indicating control options or categorizations for content (such as, a story) to be used in ordering, organizing, or displaying content according to specific embodiments of the invention.

FIG. 7 illustrates an example administrative graphical user interface for indicating control options or categorizations for content (such as, a story) to be used in ordering, organizing, or displaying content according to specific embodiments of the invention.

Example Methods for Creating a View

According to specific embodiments of the invention, the invention creates a gallery view and also optionally a story view from the available or indicated content for a story. Various characteristics of different gallery views and story views will be understood from the examples provided in FIGS. 1 though 4. In specific and in some cases preferred embodiments, these views are created "on the fly" at a server system and presented there from to a client system. In an example and presently preferred embodiment, a gallery view is determined from underlying content using logic methods as described below.

In a specific embodiment, a logic routine according to the invention first selects a basic formatting structure or logic for the content based on some overall characteristics of the content. In one embodiment, this step is referred to as "selecting a template," which will be generally understood from the context below.

In a particular implementation, a template is selected for a gallery view using the amount of text and the number and types of other files that are associated with the story or included as part of a story. In one example implementation, the conditions are checked in the following order:

| Condition | Template |
| --- | --- |
| Has video file | Video template |
| Has audio file | Audio template |
| Has at least four images and no or little text | Mostly images template |
| Otherwise | Text and images template |

Examples of various possible templates are as described below.

Video or Audio Template

In an example embodiment, these templates are similar and contain only text and the video or audio file, no images are included. Alternatively, some images may be included. In an example embodiment, the video or audio window size is fixed and this determines the sizes of the text areas, as described below.

Mostly Images Template

In this example, the specific template selected depends on whether there are four images or more and can optionally also depend on the number of images having landscape and portrait formats. If there are more than five images only five will be included. In that case a template with mixed landscapes and portraits will be selected if possible. In one example, the images are scaled in order for the images, text, and author/title section to make up a perfect rectangle, if possible. The number of authors and the size of the text affect the actual sizing of the images.

Text and Images Template

In one example, this template contains text and zero to three images and there may be is a preferred size and a maximum size of each image (though the maximum size of one image may depend on the actual size of another image). The actual images are selected with dimensions as close to (but not smaller, if possible) the preferred size. If the size of the image is greater than the maximum size the image will be scaled down. The images in an example template are never scaled up. This means that the actual sizes of the images will affect the template and thus provide additional variation between different stories. The template is adjusted depending on the number of images and the actual sizes of the images. In certain cases additional text areas are inserted, e.g. if an actual image is not as high or not as wide as the preferred size. The sizes of the text areas are determined by the actual images. The population of the text areas is described below.

Text Areas

The following example algorithm is used for selecting all texts, except for the mainly images template, which contains all available text. In specific embodiments, the actual template and potentially the actual images associated with a story determines the number and sizes of the text areas.

Initially, the algorithm selects a number of text sections from the story text to fill out all the text areas. In one example, quotes are selected first, provided they have a certain size. If they are too small they are not selected, if they are too big they will be truncated, preferable at the end of a sentence. If more text sections are indicated by the template and number of images available, the algorithm looks for paragraphs next. Again, if the paragraphs are too small they are not included, and if they are too big they will be truncated, preferably at the end of a sentence.

If still more text sections are needed, the algorithm starts including text from the beginning of the story, skipping the conditions for the first two groups of text sections and skipping text sections already included.

In further embodiments, the algorithm takes a list of text areas, each described by their dimensions and selects a number of different font sizes. The algorithm then associates the text sections found as described above with the text areas. The algorithm estimates the size of the text (considering both the line length and the height of the text area, and the line and word breaks in the selected text) for each font size, and chooses the largest font for which the text will fit into the text area. This will generally mean that the gallery view provides varying font sizes for the individual text areas, and this will depend on the actual template, image sizes, and story text. In a system or presentation that has multiple stories, this characteristic thus provides variation over different stories.

Embodiment in a Programmed Information Appliance

Figure 8:
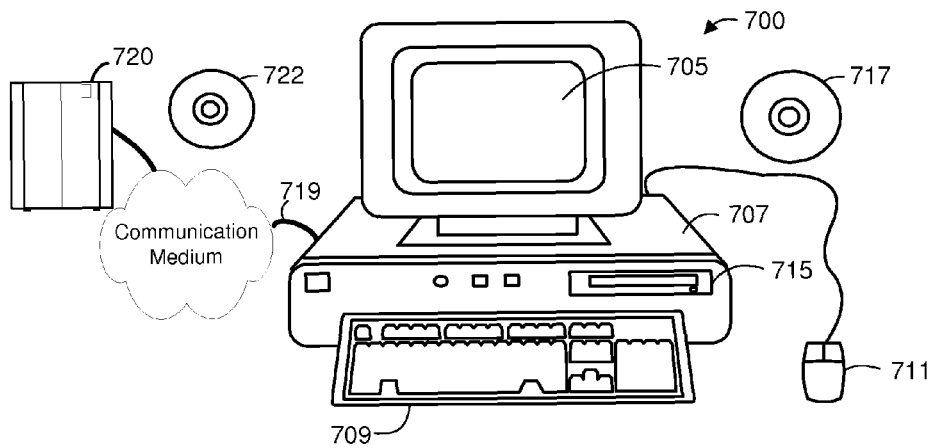
FIG. 8 is a block diagram showing a representative example logic device in which various aspects of the present invention may be embodied.

FIG. 8 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a user accesses through a communication medium in order to download a program component.

FIG. 8 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

Other Embodiments

The invention has now been described with reference to specific embodiments. Other embodiments will be apparent to those of skill in the art. In particular, a user digital information appliance has generally been illustrated as a personal computer. However, the digital computing device is meant to be any information appliance for interacting with a remote data application, and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

What is claimed:

1. A method of presenting data to a user using a computer system comprising:
    accessing an original presentation comprising two or more items of text and/or photos and/or other media;
    using an automatic summary module to create a gallery view comprising an arrangement of portions of said two or more items;
    wherein said automatic summary module determines said gallery view by analyzing a total number and relative number of each type or amount of said two or more items;
    as a result of said analyzing, said automatic summary module selects a template for said gallery view;
    wherein said template specifies one or more of:
    window sizes of video items;
    window sizes of audio items;
    sizes of text areas;
    numbers of text areas;
    sizes and orientations of image items; number of images; and
    scaling of images;
    as a result of said analyzing, said automatic summary module determines inclusion of and an arrangement of said items or portions of said items based on content or characteristics of media items;
    wherein said automatic summary module selects and arranges text portions of said gallery view by:
    referencing a selecting template;
    referencing images associated with a story to determine a number and sizes of the text areas;
    selecting a number of text sections from the story to fill out the text areas;
    wherein said selecting selects text by examining one or more of:
    paragraphs;
    paragraph size; and
    text placement in the story;
    selecting a number of different font sizes for text areas;
    associating text sections with the text areas;
    estimating the size of the text;
    choosing a font for which the text will fit into the text area such that the gallery view provides varying font sizes for the individual text areas, where this depends on the template, image sizes, and story text;
    such that in a system or presentation that has multiple stories, providing variation over different stories; and
    presenting said gallery view to said user.

2. The method according to claim 1 wherein said automatic summary module creates said gallery view on the fly in response to a user request.

3. The method according to claim 1 further comprising: providing in said gallery view a plurality of indications to other gallery view stories.

4. The method according to claim 1 further comprising: providing an indication allowing a user to post comments to the story.

5. The method according to claim 1 further comprising: providing indications allowing said user to switch easily between said gallery view and story views.

6. The method of claim 1 wherein said presenting includes displaying HTML encoded data.

7. A non-transitory computer readable storage medium containing computer interpretable instructions that when loaded into an appropriately configured information processing device will cause the device to operate in accordance with the method of claim 1.

8. The method of claim 1
    wherein said selecting selects text by examining one or more of:
    quotes;
    quote size;
    paragraphs;
    paragraph size; and
    text placement in the story.

9. The method of claim 8 wherein if still more text sections are needed, including text from the beginning of the story, skipping text sections already included.

10. The method of claim 8 further comprising:
    said estimating the size of the text comprises considering both the line length and the height of the text area, and the line and word breaks in the selected text for each font size.

* * * * *